Jan. 30, 1968  J. BAUDE  3,366,797
OUTPUT CONTROL MEANS FOR AN AC STANDBY POWER SUPPLY SYSTEM
Filed April 27, 1964  4 Sheets-Sheet 3

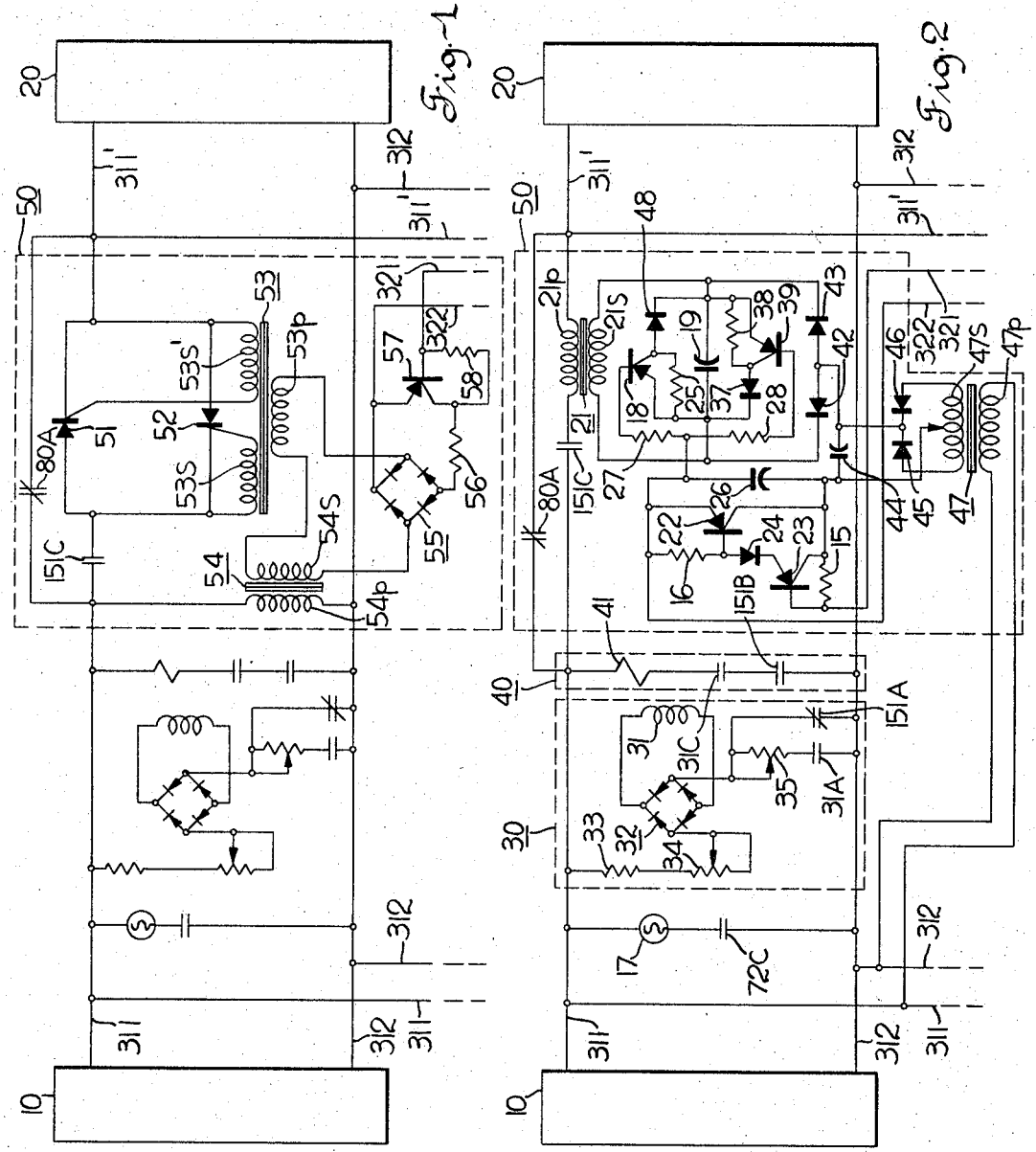

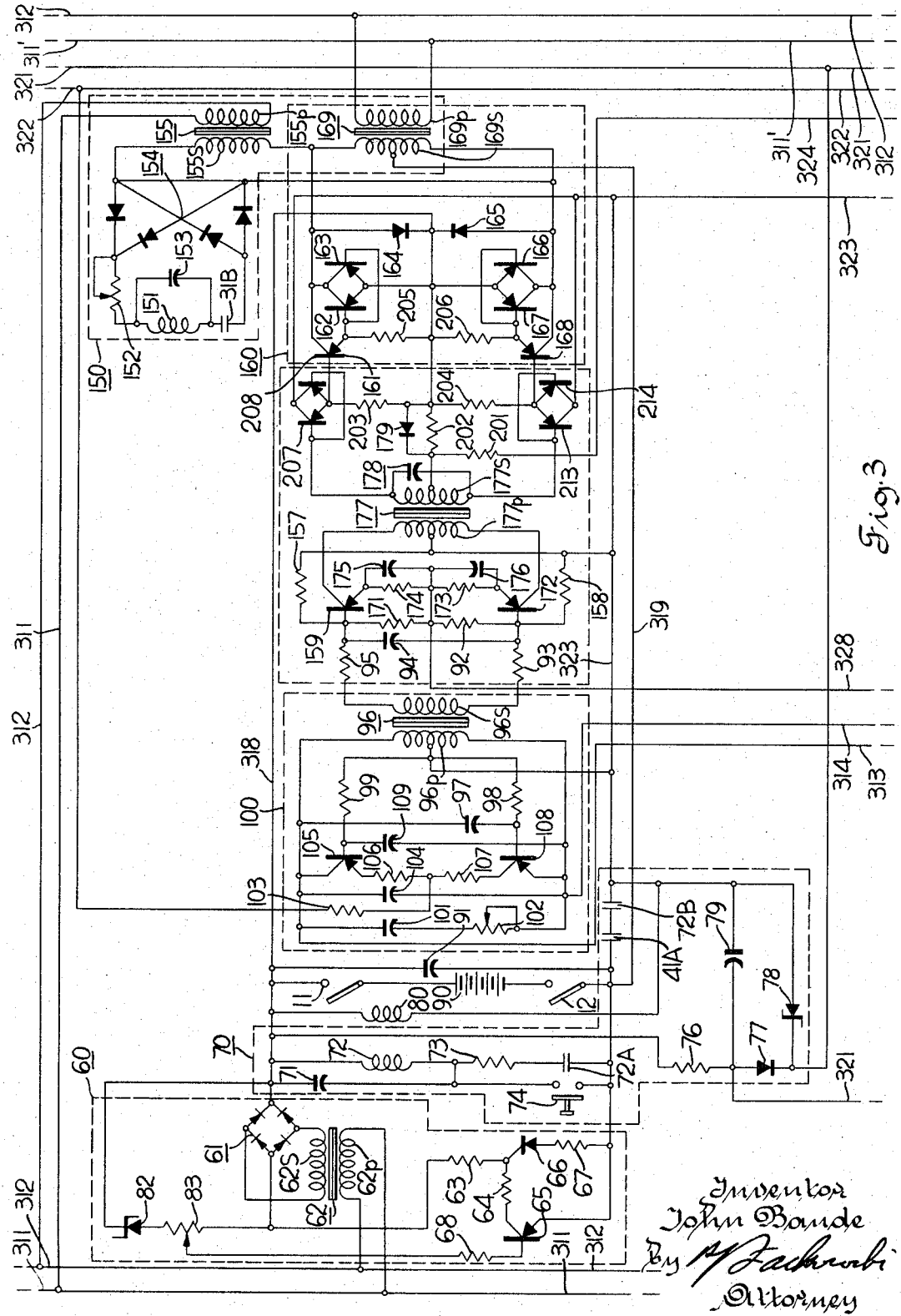

Inventor
John Baude
By R.J. Falkowski
Attorney

Inventor
John Baude

United States Patent Office 3,366,797
Patented Jan. 30, 1968

3,366,797
OUTPUT CONTROL MEANS FOR AN AC STANDBY POWER SUPPLY SYSTEM
John Baude, Milwaukee, Wis., assignor to Allis-Chalmers Manufacturing Company, Milwaukee, Wis.
Continuation-in-part of application Ser. No. 282,529, May 13, 1963. This application Apr. 27, 1964, Ser. No. 362,914
16 Claims. (Cl. 307—66)

This invention relates to power inverter systems that are utilized as standby power supply systems that furnish alternating current power to a load from a standby power source in the event of failure of the normal or primary AC supply. Particularly it relates to the means provided to control the level of power delivered to the load when the load is energized from the standby source.

This application is a continuation-in-part of my copending applications Ser. No. 282,529, filed May 13, 1963, now U.S. Patent 3,293,446, and Ser. No. 357,688, filed Apr. 6, 1964.

In some systems that use alternating current to supply a load, it is often necessary, or at least highly desirable, to provide means for supplying alternating current power if the primary power source fails. This need has led to the development of AC standby power supply systems that operate from an alternate source of power. A common alternate source of power is a battery because it is reliable and continuously available without requiring much maintenance or observation.

In utilizing a battery to furnish the alternate emergency power supply to an AC load, three basic systems are available.

The first system operates a power inverter continuously from the battery to supply the load and uses a battery charger to maintain the charge level of the battery. In the event of failure of the alternating current power supply the inverter keeps operating until the battery discharges to a point too low to supply the power requirements of the load.

The second system also operates a power inverter continuously but relies upon a rectifier for furnishing power to the inverter. A battery is used to furnish power upon failure of the alternating current power source.

The third system connects the alternating current supply directly to the load and has the battery and power inverter in a separate circuit. Additional circuitry is connected to the AC power supply to sense the power being furnished. In the event of failure of the AC power source it disconnects the normal AC power supply and turns on the inverter which then operates from the power furnished by the battery to energize the load.

This invention is utilized with the third general scheme and is directed toward means for turning on the inverter to power the load when the primary source has failed and is especially advantageous when the inverter is turned on as a result of an instantaneous loss. Since the output of an inverter may be controlled by a voltage regulator that does not respond as rapidly as necessary if the changeover from the primary source to the inverter is to be accomplished without a significant voltage drop, means are required to produce an instantaneous output level of the inverter at the instant of turning on of the inverter until the voltage regulator is operating. Therefore, output control means are provided to control the output of the inverter at the instant that it is turned on to produce the power required for the load substantially instantaneously.

The objects of this invention are: to provide a new and improved AC standby power supply system; to provide an AC standby power supply system that is highly reliable and requires little maintenance; to provide a standby system that is flexible in design and application; to provide a standby system that can switch from normal to standby without any significant loss of power delivery to the load; to provide an AC standby system that controls the current flow from the DC source to the load by varying the conductance of the inverter; to provide a standby system that provides an inverter output that may be varied to meet the load requirements; to provide a standby system that provides AC power at the required level to a load instantaneously upon failure of the normal power supply; and to provide a standby system that can be adjusted to select the level of instantaneous power output from the inverter when the inverter is first turned on.

Other advantages and objects will appear from the detailed description of the invention.

FIG. 1 is a schematic drawing of a portion of a circuit embodying this invention;

FIG. 2 is a schematic drawing of a portion of a circuit embodying this invention;

FIG. 3 is a schematic drawing of a portion of a circuit embodying this invention;

Figure 4:
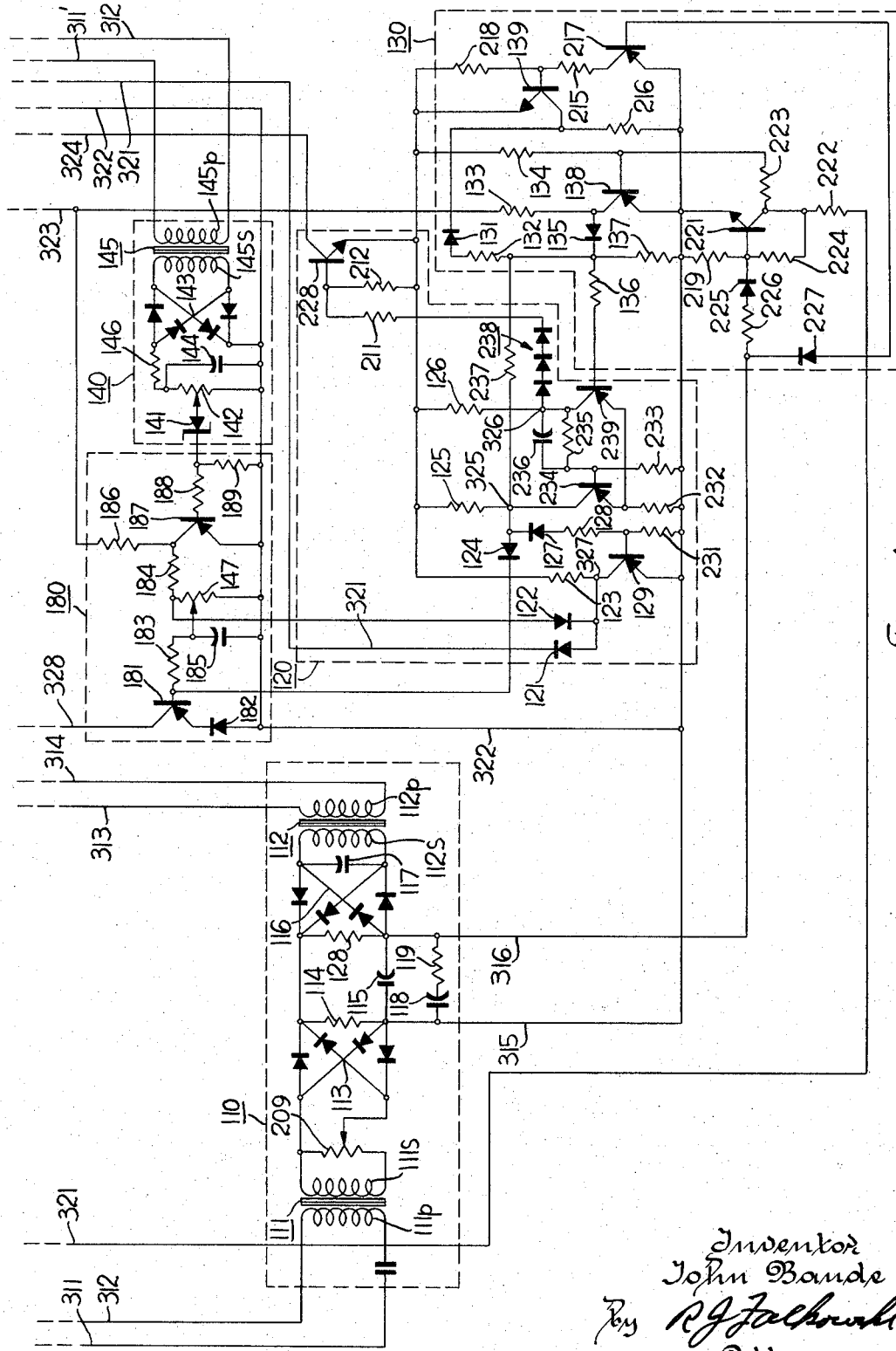
FIG. 4 is a schematic drawing of a portion of a circuit embodying this invention.

Referring to FIGS. 2, 3 and 4, a primary AC power source 10 is connected to a load 20 through a switch circuit 50. A DC source comprising a battery 90 and a battery charger 60 (FIG. 3) is provided to furnish power upon failure of AC power source 10.

Static output means are provided to produce the necessary AC power from the DC source upon failure of the AC power source. The static output means comprises power means for inverting the DC power and output control means for controlling the power means to maintain a power means output of sufficient power to properly operate the load.

The power means comprises an inverter circuit 160 and a driver circuit 170 for controlling the inverter circuit.

The output control means, which comprises an output sensing circuit 140 and an output control circuit 180, is connected to load 20 to continuously sense the current flow through the load so that when the load is energized by the inverter the required power is furnished to the load at the desired level. The output control means also provides a substantially instantaneous recovery of voltage at the load at the instant the primary AC source fails and the inverter is turned on.

A switching control means is provided for sensing the condition of the AC power source and for controlling the standby system to supply the load from the primary AC power source or from the DC source in response to the conditions of the primary AC power source and DC source. The switching control means comprises switching means, reference signal means, synchronizing means, voltage sensing means and protection means.

The switching means, which comprises switch circuit 50 and a bypass relay 80, is provided for connecting or disconnecting the AC power source from the load, and is controlled by other portions of the control means.

The reference signal means, which comprises an oscillator circuit 100, is provided for producing a reference signal of predetermined amplitude and wave shape that is compared to the AC power source output to determine the condition or voltage of the AC power source. The reference signal is of a controlled frequency and is used as a control frequency for the AC power produced by inverter circuit 160.

The oscillator is tuned to have a slightly different frequency from the AC power source. Thus, when the AC power source is restored, the switching of the load back to the AC power source is selected to occur at the precise moment the AC power source and the inverter are in phase.

The synchronizing means is provided for synchronizing the AC power source output and the inverter output when switching from one power source to the other. The synchronizing means comprises a reference phasing control means and a phase synchronizing means.

Figure 5:
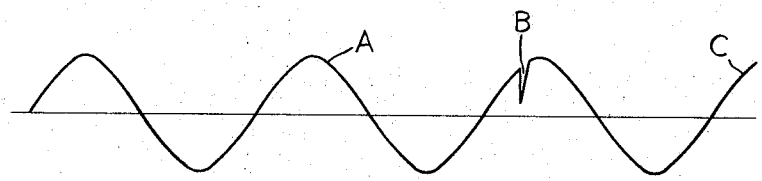
FIGS. 5, 6, 7 and 8 show wave forms appearing in various parts of the circuitry of the system.

The reference phasing control means provides for synchronization when switching from the AC power source to the DC source. This is accomplished by connecting the AC power source to control the oscillator frequency and somewhat by feeding back power from the load through inverter 160 to oscillator 100. Thus, when the inverter is energized to supply AC power to the load and the AC power source is disconnected from the load, the inverter output is at this instant in phase with the AC power source. The reference phasing control means becomes inoperative after switchover to inverter power and the tuned frequency of the oscillator controls the frequency of the inverter AC power. Therefore, curve C, as shown in FIG. 5, is of a slightly different frequency than curve A.

The phase synchronizing means, which comprises synchronizing circuit 150, is provided for switching the load from the inverter output to the AC source when they are in phase. Since the tuned frequency of the oscillator, and therefore the frequency of the inverter output, is slightly different from the frequency of the power source, the two frequencies will coincide in phase angle relationship within a short period of time after restoration of the AC power source. The phase synchronizing means responds to the phase relationship to effect the connection thereby restoring the standby system to a standby status. The system is then again ready to switch back to operation from the DC source if the AC power source should again fail.

The voltage sensing means is provided for sensing the condition of the AC power source output to effect energizing of the load from the DC source when the AC power source output drops to a predetermined level. The voltage sensing means comprises an instantaneous voltage comparison means and a voltage level sensing means.

The instantaneous voltage comparison means is provided for substantially instantaneously sensing a deviation in the wave form of the AC power source output. The instantaneous voltage comparison means comprises a voltage comparison circuit 110, a pulse circuit 130, and a voltage sensing control circuit 120.

Figure 6:
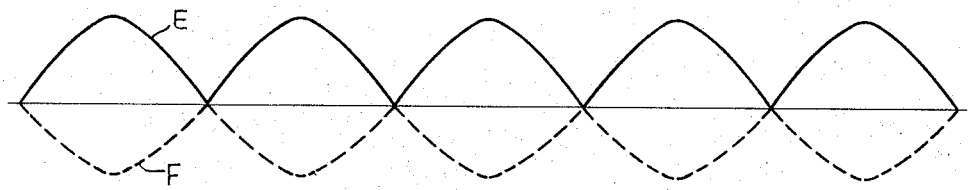
Figure 7:
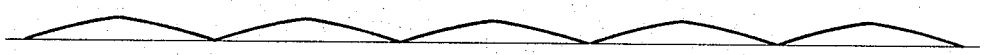

Voltage comparison circuit 110 receives a measure of the AC power source output and the reference signal and compares them to produce an output varying as a function of the AC power source and the reference signal. By selecting the amplitude and wave shape of the reference signal, the output of the voltage comparison circuit can be selected to indicate an instant deviation from the desired wave form. Normally, an instantaneous drop of the AC power source voltage below a predetermined level is sensed to produce a voltage comparison circuit output reflecting the amount of this drop. FIG. 6 shows how the AC power source output and the reference signal are compared with curve E being the AC power source signal and curve F the reference signal. FIG. 7 shows a resultant output from the voltage comparison circuit.

Figure 8:

Pulse circuit 130 responds to the voltage comparison circuit output to produce pulses of one polarity when the AC power source is at the required voltage within preselected limits as shown in FIG. 8; and to produce pulses of an opposite polarity when the voltage of the power source is not of the required voltage.

Voltage sensing control circuit 120 responds to the polarity of the pulses of the pulse circuit to effect switching of the switching means and to control the energization of the output means by the DC source.

The voltage level sensing means, which comprises a relay circuit 30, is provided for more slowly responding to a continuous predetermined low voltage of the AC power source output. The level is selected to be higher than the instantaneous level that would affect the instantaneous voltage comparison means.

Thus, the voltage sensing means responds to an instantaneous voltage drop that would adversely affect the load and also responds to a lesser voltage drop that would adversely affect the load only if it continued for a predetermined longer period of time.

The protection means, which comprises a battery disconnect circuit 70 and a timing means 40, is provided for making the standby system inoperative if the battery voltage is below a predetermined level. This prevents abnormal operation that could result from supplying load power from a weak DC source and also prevents complete discharge of the battery.

Battery disconnect circuit 70 responds to a predetermined minimum voltage level of the battery to open switch circuit 50 through the operation of a bypass relay contact 80A of bypass relay 80. At the same time the battery is disconnected from the remainder of the standby system to prevent further discharge of the battery.

Timing means 40 is provided to similarly connect the AC power source to the load and disconnect the battery from the rest of the system after a predetermined continuous interval of energization of the load from the DC source. The interval may be selected to prevent excessive discharging of the battery when the time required for load operation after failure is known. For example, the load may be emergency equipment used to switch in alternate power sources and the need for energizing may end after a short interval. In this case it would be advisable to disconnect the battery after these functions are completed rather than allow the standby system to operate until the battery voltage drops sufficiently to affect battery disconnect circuit 70.

Means are provided by a battery charger 60 for maintaining the battery at its full charge. Battery charger 60 receives AC power from the AC source along conductors 311 and 312 at a primary winding 62p of a transformer 62. A secondary winding 62s produces an output which is rectified by a full wave rectifier 61. The rectified power is applied to battery 90 through a silicon controlled rectifier 66 that is triggered into conduction by a transistor 65 across a resistor 64 when battery voltage falls below the adjusted voltage of a zener diode 82. A resistor 67 is connected in series with SCR 66 to limit the charging current pulses to a predetermined maximum. A resistor 63 keeps SCR 66 turned off when transistor 65 is turned off. An adjustable resistor 83 permits small deviations from the voltage rating of zener diode 82. Transistor 65 is turned on at a level determined by a bias resistor 68.

In the following description of the circuitry the operation of the standby system shall be called "normal" when the load is being powered by AC power source 10 and the operation shall be called "emergency" when the load is being powered by battery 90.

Upon turning on the system for normal operation, relay circuit 30 (FIG. 2) receives power from AC power source 10 along conductors 311 and 312 and activates synchronizing circuit 150 (FIG. 3) which operates to place the standby system in a readiness condition. Battery 90 is connected into the circuitry and supplies power to oscillator circuit 100. The oscillator circuit is then ready to provide power for the operation of other portions of the system and also provides a reference signal of a predetermined level and wave shape. The reference signal is conducted along oscillator conductors 313 and 314 to voltage comparison circuit 110 (FIG. 4).

Voltage comparison circuit 110 receives this reference signal and also receives the AC power source output along conductors 311 and 312 and compares the AC power source output to the reference signal. Voltage comparison circuit 110 then furnishes a resultant output along sensing conductors 315 and 316 to pulse circuit 130. Pulse circuit 130 analyzes the output from voltage comparison circuit 110 and supplies this information to voltage sensing control circuit 120. Voltage sensing control circuit 120 produces an output that indicates to the remainder of the circuitry that the condition is one of normal operation (or emergency operation).

During normal operation the remainder of the circuitry is not activated. During emergency operation voltage sensing control circuit 120 energizes driver circuit 170 by connecting it to the battery. At the same time driver control circuit 180 and inverter circuit 160 are energized and brought under control of output sensing circuit 140. Also, AC power source 10 is disconnected from the load through switch circuit 50 and the load is powered along conductors 311' and 312 by inverter circuit 160. The changeover from the AC power source to the DC source supplying AC power is very rapid and takes less than one-half millisecond. FIG. 5 shows the wave form of the AC power source output, sine wave A, and the wave form of the power produced by the system, sine wave C, when the AC source fails. The system also attempts to make up for lost time by instantly increasing its voltage output to a point where it would have been if the voltage of the normal AC power source would have been continued at a normal level. This is also shown in FIG. 5 by the sharp drop and rise back to the voltage of the normal sine wave at the changeover point, point B.

Referring to FIGS. 2, 3 and 4, to place the system in standby status (normal operation), AC power from source 10 is applied across terminals 311 and 312. Switches 11 and 12 (adjacent battery 90) are closed to ready the standby system by applying battery potential to conductors 318 and 319. At the instant of connecting the AC power source to conductors 311 and 312 the current flows through normally closed contact 80A and conductors 311 and 311' to load 20.

Contact 80A is a normally closed contact of bypass relay 80 that opens immediately after a timing relay 41 has operated to close a contact 41A in response to the applied AC power and in response to the closing of switches 11 and 12. Relay 80 is energized to open contact 80A when contact 41A and a contact 72B of a battery disconnect relay 72 are closed. When the battery charge level drops below a predetermined minimum level, contact 72B opens to deenergize bypass relay 80 (thereby closing contact 80A) and to disconnect the battery from the remainder of the circuitry. The system is then inoperative and source 10 is connected to load 20 through contact 80A regardless of the output level or condition of source 10. Timing relay 41 is disconnected from the AC source upon failure of the AC source by the opening of either contact 31C or 151B and after a predetermined period of time opens to make the system inoperative and to convert source 10 to load 20.

When AC power from source 10 is present, power is supplied along conductors 311 and 312 to relay circuit 30. Relay circuit 30 comprises a control relay 31 that has three contacts: contact 31A in relay circuit 30; contact 31B in synchronizing circuit 150, and contact 31C in timing means 40. Control relay 31 receives current through a full wave rectifier 32 from the AC power source. A resistor 33 and a variable resistor 34 are connected in series with the full wave rectifier and upon application of AC power a circuit is completed through the resistors and a normally closed contact 151A of synchronizing relay 151 in synchronizing circuit 150. Upon energization of control relay 31. contact 31A closes and locks in relay 31. When relay 31 is locked in, it then functions as a voltage level sensing device, as explained. A variable resistor 35 is adjusted so that the contacts of control relay 31 opens when the AC power source voltage drops below a certain level. Control relay 31 operates at a comparatively slow rate extending over several cycles.

When control relay 31 is energized it also closes contact 31B in synchronizing circuit 150. Synchronizing circuit 150 comprises a synchronizing relay 151 connected in series with a variable resistor 152, a capacitor 153 connected in parallel with the coil of synchronizing relay 151, a full wave rectifier 154, and a secondary winding 155s of a transformer 155. Synchronizing circuit 150 receives power from AC source 10 through secondary winding 155s of transformer 144 and a secondary winding 169s of a transformer 169. Upon closing of contact 31B synchronizing relay 151 is energized to open its normally closed contact 151A and close its normally open contacts 151B, 151C and 151D, provided voltages of windings 169s and 155s are essentially in phase, as will be later explained.

Contact 151A is located in relay circuit 30 and when opened upon energization of relay 151 places relay circuit 30 in a ready state to sense voltage.

Contact 151B is located in timing means 40 and when closed completes a circuit from the AC power source across timing relay 41. (The other contact in timing circuit 40, contact 31C, has been closed by the activation of control relay 31.) Upon completion of the circuit through timing relay 41, its contact 41A, located in battery disconnect circuit 70, is closed.

Upon energization for normal operation, timing relay 41 operates to close its contact 41 within a very few seconds after AC power from source 10 is present and contacts 31C and 151B are closed. The closing of contact 41A connects the battery to conductor 323 if contact 72B is closed.

During emergency operation, timing relay 41 operates after a selected period of time to open its contact 41A to disconnect the battery from conductor 323 and the remainder of the circuitry. This timing operation is optional and is utilized to save the battery from total discharge or to limit its time of operation. In the system shown in the drawings, source 10 is automatically reconnected to load 20 at the end of the timed period (when contact 41A opens) because relay 80 drops out to close contact 80A.

Contact 151C in switch circuit 50, when closed, connects AC power source 10 along conductor 311 through a primary winding 21p of a transformer 21 along conductor 311' to load 20. The normally closed contact 80A is open during standby (normal) operation because relay 80 is energized.

Contact 151D in voltage sensing circuit 110, when closed, connects a primary winding 111p of a transformer 111 to AC source 10 along conductors 311 and 312.

After application of sufficient AC power to the system, battery 90 is still not connected to the remaining circuitry because contact 72B in battery disconnect circuit 70 is still open. In order to close this contact and connect the battery, a push button switch 74 must be depressed to energize battery disconnect relay 72. This completes a circuit from the negative terminal of the battery, conductor 319, through switch 74 and the coil of battery disconnect relay 72 along conductor 318 to the positive terminal of the battery. This closes contact 72A thereby maintaining the relay in an energized condition with current flowing from the negative terminal of the battery along conductor 319 through contact 72A, resistor 73, and the coil of relay 72 to the positive terminal of the battery along conductor 318. Resistor 73 is selected so that battery disconnect relay 72 will drop out if the battery voltage is below a predetermined level. Therefore, unless the battery is charged to this predetermined minimum level, voltage relay 72 will deenergize when push button switch 74 is opened to open contacts 72A and 72B. Since push button switch 74 is normally open, relay 72 will be deenergized whenever the battery voltage drops below this predetermined minimum level. A capacitor 71 is connected across relay 72 to prevent relay deenergization on sharp voltage dips of short duration which may result from operation of the subsequent circuitry. Deenergization of relay 72 opens contact 72B and deenergizes bypass relay 80 to close contact 80A and directly connect source 10 to load 20.

A capacitor 79 prevents relay 80 from dropping out on voltage dips.

A resistor 76, a diode 77, and a zener diode 78 function in a typical manner to provide potentials required for operation of portions of the circuitry of the system. Zener diode 78 provides a stable DC supply for the circuitry independent of battery voltage fluctuations.

When contact 72B closes, all the subsequent circuitry is connected to the battery through closed contact 41A along conductor 323. A large capacitor 91 is connected across the terminals of the battery to help in reducing the voltage dips during current surges that might otherwise deenergize relay 72.

A third contact 72C is connected across AC source 10 in series with an indicating light 17. Light 17 goes on and stays on if the battery has sufficient voltage to keep relay 72 energized and if the AC source 10 is delivering power. Therefore, light 17 serves as a visual indicator that both the AC voltage source is present and that the battery has a sufficient charge for operation. The light indicates that the system is in normal operation.

Battery 90 furnishes DC power along conductors 318, 323 and 319 to oscillator circuit 100, driver circuit 170, and inverter circuit 160.

Upon being connected to the battery, oscillator circuit 100 immediately begins furnishing the reference signal, a sine wave voltage, along conductors 313 and 314 to voltage comparison circuit 110 at a primary winding 112p of a transformer 112.

In the operation of oscillator circuit 100, transistors 105 and 108 are controlled by their respective R-C circuits of resistor 99 and capacitor 109 and resistor 98 and capacitor 97. The oscillating frequency is principally determined by the reactance of a primary winding 96p of a transformer 96 and the capacitance of a capacitor 104. A capacitor 101 is connected in series with a variable resistor 102 to provide for accurate adjustment of the frequency of the sine wave to slightly above or below the frequency of primary power source 10.

Primary winding 96p of transformer 96 is connected to primary winding 112p of transformer 112. The reactance of the two windings must be taken into account in adjusting the frequency of the oscillator.

The emitters of transistors 105 and 108 are connected to the positive terminal of the battery through resistors 106 and 107 and resistor 103, conductor 322, diode 77, and resistor 76. By properly selecting the capacitor, reactance, and resistor values in the circuit, the oscillator will produce an output sufficiently accurate in frequency for this particular type of application. Oscillator circuit 100 is locked into synchronization with the alternating current from power source 10 when the AC power source is connected to voltage comparison circuit 110.

The reference signal from oscillator circuit 100, delivered to winding 112p of transformer 112, appears across a secondary winding 112s. The voltage appearing across secondary winding 112s is filtered by a capacitor 117 and rectified by full wave rectifier 116. This voltage appears across a resistor 128 and is shown by curve F in FIG. 6.

A secondary winding 111s of transformer 111 in voltage comparison circuit 110 is connected to source 10 along conductors 311 and 312 and is rectified by full wave rectifier 113 to produce a signal, as shown in curve E in FIG. 6, across resistor 114. A variable resistor 209 is connected to adjust the voltage appearing at resistor 114 so that the two voltages, appearing across resistors 114 and 128, may be appropriately balanced for comparison. In this manner the voltage of source 10 and the reference signal are instantly compared to determine if the AC source voltage has dropped below a predetermined level. The resultant output of the comparison circuit appears as shown in FIG. 7 for the example curves of FIG. 6.

A resistor capacitor network in voltage comparison circuit 110, comprising capacitors 115 and 118 and a resistor 119, serves a dual function. First, it controls the response of secondary winding 112s to the voltage appearing across winding 111s so that it feeds back to oscillator 100 and locks the oscillator output in with the alternating current from source 10. Second, it receives the difference of the voltages across resistors 114 and 128. Resistor 209 is adjusted so that the output from voltage comparison circuit 110, which is delivered along conductors 315 and 316, is positive when the voltage of power source 10 is above a predetermined minimum level. When the power source voltage is below this minimum level the output along conductors 315 and 316 is negative.

This output from voltage comparison circuit 110, positive for normal operation and negative for emergency operation, is supplied to pulse circuit 130. This output is a half cycle pulse output, as shown in FIG. 7. These half cycle pulses are applied to the base of a transistor 221 through a resistor 226 and a diode 225. If the pulses, which appear across resistors 222 and 224, are positive, the positive voltage repeatedly turns on transistor 221. Resistor 224 is primarily a bias resistor providing negative feedback action that helps to improve the transistor small signal response and a resistor 219 provides proper cut-off for transistor 221. A voltage divider formed by series connected resistors 222, 223, and 134 is connected between the positive and negative terminal of the battery along a conductor 321 (through resistor 76) and conductor 323. The turning on of transistor 221 makes the base of a transistor 138 negative across resistors 223 and 134.

Making the base of transistor 138 negative turns it on to pass a positive pulse appearing across a resistor 133, through diode 135 and a resistor 136 to the base of a transistor 239 in output control circuit 120.

In a similar manner, diodes 227 and 131 and transistors 217 and 139 acting with resistors 215, 218, 216 and 132 operate to produce negative pulses which are applied to the base of transistor 239 when the output voltage from voltage comparison circuit 110 is negative.

Thus, during normal operation, pulse circuit 130 supplies positive square wave pulses (FIG. 8) to the base of transistor 239 and during emergency operation pulse circuit 130 supplies negative square wave pulses to the base of transistor 239.

Voltage sensing control circuit 120 comprises a bistable flip-flop circuit of the Schmitt Trigger type. The flip-flop circuit is made up of transistor 239 and a transistor 234; resistors 126, 125, 235, 233 and 232; and capacitor 236. A feedback resistor 237 and bias resistor 137 (in circuit 130) are added to improve stability.

The bistable characteristic of the flip-flop circuit in voltage sensing control circuit 120 identically follows the two states of operation of the standby power supply system as indicated by the pulses from pulse circuit 130, that is, it places the system in normal operation when the pulses are positive and places it in emergency operation when the pulses are negative.

When transistor 239 is turned on, it turns off transistor 234 and when transistor 239 is turned off, it turns on transistor 234. Since transistor 239 turns off when it is receiving positive pulses (normal operation) transistor 234 is turned on and a point 325 assumes a potential, which is slightly less positive than the battery positive terminal, across resistor 232 and resistor 76 and a diode 77 (FIG. 3, circuit 70) connected by conductors 315 and 322.

A diode 127, resistor 128 and a resistor 231 are selected to permit a transistor 129 to turn off when transistor 234 is turned on. When transistor 129 is turned off diodes 121 and 122 are connected to a point 327 and to the negative terminal of the battery through a resistor 123 along conductor 323. A series diode circuit 238 and a point 326 are also connected through resistor 126 to the negative terminal of the battery along conductor 323.

When transistor 234 is turned on (normal operation) diode 124 passes positive potential from the battery to the base of a transistor 181 (in driver control circuit 180) to turn it off. This blocks current flow to driver circuit 170. A capacitor 185 is substantially charged through diode 122 across resistor 123. Since transistor 181 is turned off, point 327 becomes negative because resistor 123 is connected to the negative terminal of the battery along conductor 323. The negative charge on capacitor 185 holds driver control circuit 180 and output sensing circuit 140 inoperative because the base of transistor 181 is held to the positive potential through diode 124 and conducting transistor 234 to conductor 322.

Diode 121 controls switch circuit 50. When transistor 129 is turned off (normal operation), diode 121 is reverse biased thereby controlling switch circuit 50.

When the input to pulse circuit 130 from voltage comparison circuit 110 is negative (emergency operation), transistor 217 (circuit 130) receives negative half cycle pulses through diode 227 and is alternately turned on and off. These pulses are amplified by transistor 139 which has its base connected to a voltage divider comprising resistors 218 and 215. When transistor 139 is turned on, a strong negative potential from the negative terminal of the battery along conductor 323 is conducted from the emitter to the collector of transistor 139 through diode 131, resistor 132, and resistor 136 to the base of transistor 239. Voltage sensing control circuit 120 is thereby turned on to change the system to emergency operation.

When transistor 239 receives a negative pulse, it is turned on, transistor 129 is turned on, and transistor 234 is turned off. Transistor 129 turns on because negative potential is supplied to its base from the conductor 323 through resistor 125, diode 127 and resistor 128. Diode 121 then passes positive potential to a transistor 23 in switch circuit 50. This changes switch circuit 50 from its on to off condition.

Diodes 122 and 124 are reverse biased and function as switches to make the base of transistor 181 negative across a resistor 183 by the charge previously built up on capacitor 185 and thereby turn on transistor 181 at a predetermined instantaneous level. After the instant turning on of transistor 181, the negative charge of capacitor 185 is controlled by output control circuit 180 through a transistor 187, resistors 184, 186, 188 and 189, zener diode 141 (in output sensing circuit 140) and the setting of potentiometer 146 through the operation of output sensing circuit 140.

At the instant of switching over to the emergency condition the output control means becomes effective. The output control means performs the function of varying the conductance of transistor 181 in response to the output of output sensing circuit 140 to control the level of direct current delivered to driver circuit 170. The control of the input to driver circuit 170 controls the output of the inverter circuit 160 to maintain the required voltage across the load. If the voltage across the load drops, transistor 181 is made more conductive to increase the output current of the inverter.

The output control means provides another function of instantaneously turning on transistor 181 at a predetermined conductance at the instant of switching to emergency operation.

This is accomplished by providing means for applying a predetermined voltage to transistor 181 at the instant of switching. In this embodiment capacitor 185 is charged to a predetermined level during normal operation and is discharged to turn on transistor 181 to a predetermined conductance at the instant of switching before output sensing means 140 becomes effective.

Means are provided for selecting the level of charge of capacitor 185 to determine the initial control current from the battery to the driver circuit through the emitter-collector circuit of transistor 181. If the load requirements are known or vary within noncritical limits this means may comprise potentiometer 147 which is adjusted to furnish the required voltage level of the charge on capacitor 185. If necessary, other devices could be used in place of potentiometer 147 that would sense the load conditions at all times and vary the charge on capacitor 185 accordingly.

Output sensing circuit 140 is essentially a voltage regulator and comprises a variable resistor 142, a full wave rectifier 143, a capacitor 144, a resistor 146, and a transformer 145 with a primary winding 145p and a secondary winding 145s. The load voltage appears across primary winding 145p of transformer 145 and a measure of this voltage appears at secondary winding 145s. The voltage appearing at the secondary winding is rectified by rectifying circuit 143. Capacitor 144 is charged through resistor 146 and maintains a charge that is substantially equal to the RMS voltage of the load. The voltage of capacitor 144 is applied across potentiometer 142 and the tap of this potentiometer is used to deliver a preselected portion of the capacitor voltage to zener diode 141. The adjustment of potentiometer 142 enables the selection of a predetermined minimum voltage across the load.

At a preselected level determined by the relationship of the primary and secondary windings of transformer 145, the setting of potentiometer 142, and the characteristics of zener diode 141, zener diode 141 breaks down and current flows through resistor 189, resistor 188, and the base-emitter junction of transistor 187 to proportionally make transistor 187 more conductive. When transistor 187 is turned on, current flows from conductor 322, potentiometer 147, resistor 184 and resistor 186 to conductor 323. Capacitor 185 is charged at a level determined by the setting of potentiometer 147 and functions generally to filter any sharp fluctuations in voltage appearing at the top of potentiometer 147.

Transistors 187 and 181 operate so that under expected conditions they are not saturated. Therefore, if the conductance of transistor 187 increases, transistor 181 tends to turn off and becomes less conductive through its emitter-collector circuit. Therefore, when the output voltage of output sensing circuit 140 increases in response to an increased voltage at the load, transistor 187 is turned on as a function of and transistor 181 is turned off as a function of this voltage to decrease the inverter output. As a result, the output voltage of the inverter is maintained at a preselected level.

Therefore, the instant of switching over from normal operation to emergency operation, master control circuit 120 functions through diodes 122 and 124, which operate as switching devices, to apply the charge built up on capacitor 185 during normal operation to the base of transistor 181. This charge turns on transistor 181 to a preselected conductance to furnish a selected control voltage to the driver and inverter circuits to provide a selected voltage substantially instantaneously to the load.

Capacitor 185 is charged to a selected level through resistor 123, diode 122 and potentiometer 147.

During emergency operation, referring to output control circuit 120, transistor 239 is turned on and diode circuit 238 is connected through transistor 239 to the positive terminal of the battery through resistor 232. The positive terminal is then connected through a resistor 211 to the base of a transistor 228 which is then turned on to supply driver circuit 170 with the necessary negative potential from conductor 323 through conductor 324. This negative potential is utilized for crossover current correction.

Driver circuit 170 comprises a first driver stage and a second driver stage. The first driver stage receives an input from transistor 181 in output control circuit 180 along conductor 328 and receives another input from oscillator circuit 100 at secondary winding 96s of transformer 96. The first driver stage comprises capacitors 94, 175, 176; resistors 95, 93, 157, 158, 171, 92, 174 and 173; transistors 159 and 172; and a primary winding 177p of a transformer 177. Capacitor 94 is used to balance transformer impedance and improve response time and wave form. Capacitors 175 and 176 are used as bypass capacitors for resistors 174 and 173, respectively. Resistors 157 and 158 are utilized to partially accomplish crossover current correction. The circuit parameters are selected to avoid saturation of transformer 177 and transistors 159 and 172 in order to preserve the sine wave output at its maximum power level.

The second driver stage of driver 170 comprises transistors 207, 208, 213 and 214; resistors 201, 202, 203 and 204; capacitor 178; diode 179, and a secondary winding 177s of transformer 177. Capacitor 178 functions to balance the transformer impedance. Diode 179 is forward biased and limits the negative bias applied to the bases of transistors 207, 208, 213 and 214 to further accomplish crossover current correction by limiting the voltage drop across resistor 202. The transistors of the second driver stage of driver circuit 170 operate as emitter follower amplifiers. The voltage drops across resistors 203 and 204 are applied to the bases of transistors 161 and 168, respectively, in inverter circuit 160.

Inverter circuit 160 comprises transistors 161, 168, 162, 163, 167 and 166; diodes 164 and 165; and resistors 205 and 206. The power transistor arrangement in inverter circuit 160 avoids the use of transformers and provides for excellent stability and speed. Diodes 164 and 165 prevent collector potential reversal of the transistors. The power transistors provide secondary winding 169s of transformer 169 with sine wave voltage and current of a magnitude that furnishes AC power to load 20 at a primary winding 169p.

In the operation of inverter circuit 160 a means for accomplishing crossover current correction is provided. In order to conserve power, the crossover current correction is primarily applied to the second driver stage of driver circuit 170 at the instant the unit is switched to emergency operation. The correction is obtained by applying negative bias to the bases of transistors 207 and 208 and transistors 213 and 214 through transistor 228 along conductor 324, as controlled by diode circuit 238. A resistor 212 is connected to provide proper cutoff for transistor 228, at normal operation transistor 239 is turned off and diode circuit 238 is reverse biased so that resistor 212 provides negative bias to turn off transistor 228.

When the system switches to emergency operation, switch circuit 50 (FIG. 2) disconnects source 10 from load 20. Switch circuit 50 comprises transformer 21 with primary winding 21p connected in the power line across conductors 311 and 311′. The primary winding is therefore in series with source 10 and load 20 when contact 151c is closed (normal operation). The transformer is designed so that a secondary winding 21s passes very little current through the primary winding when it is opened, that is, it functions like a simple series reactor with relatively high reactance. In normal operation winding 21s is short circuited by a pair of back to back power transistors 18 and 39 with collector resistors 25 and 38 and diodes 48 and 37. Capacitors 19 and 26 are used as coupling capacitors. Diodes 48 and 37 prevent reversal of transistor collector voltage which may have a damaging effect on the transistors.

The base of each of power transistors 18 and 39 is respectively connected by resistors 27 and 28 to a typical two stage amplifier comprising transistor 23, a transistor 22, a diode 24, a resistor 16 and a resistor 15.

Base control current for power transistors 18 and 39 is obtained from secondary winding 21s of transformer 21 and from a secondary winding 47s of a transformer 47. A diode 45, a diode 46, and a capacitor 44 complete the power source. Diodes 42 and 43 are steering diodes which direct the current to the proper transistor alternately each half cycle. When diode 121, in output control circuit 120, is reverse biased (normal operation), resistor 15, connected between the base and collector of transistor 23, turns on control circuit 50 by making transistor 22 conductive.

When transistor 22 is conducting, transistors 18 and 39 are also conductive. The low impedance of the short circuited secondary winding 21s is reflected in the primary winding which carries the load current with only a very few volts drop between conductors 311 and 311′.

When the power source fails, diode 121 (pulse circuit 130) no longer reverse biases transistor 23 (switch circuit 50). Transistor 23 is then turned off and this stops the operation of transistors 18 and 39 thereby removing the short circuit across secondary winding 21s. This creates a large impedance in transformer 21 which appears in primary winding 21p and prevents current flow from source 10 to load 20.

When the AC power source fails, AC power is produced by inverter circuit 160 at primary winding 169p of transformer 169 and delivered along conductors 311′ and 312 to load 20. Also, relay circuit 30 responds to the power failure and its control relay 31 is deenergized to open its contacts 31A, 31B and 31C thereby completing the changeover to emergency operation.

If normal power is restored the system will automatically return to normal operation and commence charging battery 90 and return to standby status ready for emergency operation if the power should again fail.

Upon restoration of AC power, relay 31 is energized and its contact 31B (synchronizing circuit 150) reconnects relay 151 to secondary winding 169s of transformer 169. Since primary winding 169p is connected to load 20, and a primary winding 155p of transformer 155 is connected to power source 10, relay 151 is exposed to the instantaneous sum or differences of the two AC voltages appearing at the secondary windings 169s and 155s. Resistor 152 is adjusted so that relay 151 is activated when full wave rectifier 154 delivers a predetermined voltage. This predetermined voltage is selected as the maximum voltage that occurs when the voltage of source 10, appearing at secondary winding 155s, and the AC produced at secondary winding 169s, from inverter circuit 160, are in phase. Since the output of inverter circuit 160 is of a slightly different frequency than the AC source, normal operation is restored only at the instant that maximum voltage is obtained and the two AC sources are in phase. Capacitor 153 provides a small time delay to give relay 151 more positive action at the point of synchronization.

When the two voltages are in phase, relay 151 is activated and its contact 151B closes to energize timing relay 41 which in turn closes contact 41A to activate relay 80 and open contact 80A and place switch circuit 50 in the power line through contact 151C which is also closed. Contact 151A opens and activates control relay 31, and contact 151D reconnects primary winding 111p of transformer 111 to voltage source 10 thereby providing voltage comparison circuit 110 with voltage from winding 111s. The output voltage of voltage comparison circuit 110 then goes from negative to positive and the circuit then operates in a normal condition as previously described.

Switch circuit 50 shown as FIG. 2, may be replaced by a circuit 50′ shown as FIG. 1. This circuitry functions to disconnect power source 10 from load 20 as does control switch circuit 50.

Referring to FIG. 1, during normal operation a primary winding 54p of transformer 54 is connected to power source 10 and a secondary winding 54s is connected in series with a full wave rectifier 55, a resistor 56, a transistor 57 and a primary winding 53p of a transformer 53. A resistor 58 is connected to keep transistor 57 turned on so that current is flowing through primary winding 53p. Silicon controlled rectifiers 51 and 52 are alternately turned on each half cycle by the output voltage across secondary windings 53s and 53s′ of transformer 53.

During emergency operation the base of transistor 57 receives a positive signal from voltage sensing control circuit 120, as explained previously, when the reverse biasing of diode 121 in output control circuit 120 is removed. Transistor 57 is then turned off. On failure of the normal power source and production of AC power from the inverter circuit, current flowing through the SCR that is momentarily conducting instantly reverses and power will cease to flow across circuit 50'. The SCR is not turned on again until transformer 53 is energized by transistor 57 when voltage sensing control circuit 120 returns to normal operation to reverse bias diode 121.

In describing the invention the preferred embodiment has been shown and described but it is obvious to one skilled in the art that there are many variations, combinations, alterations, and modifications that may be made without departing from the spirit of the invention, or from the scope of the appended claims.

The embodiments of the invention in which an exclusive property or privilege is claimed are defined as follows.

I claim:

1. An electrical circuit for controlling the output level of a static electrical converter comprising: a DC source, variable conductance means for connecting said DC source to said converter, means for storing electrical energy at a preselected level, and means for controlling said means for connecting to regulate the converter output level, said means for controlling normally maintaining said means for connecting at a low conductance to turn off said converter and being responsive at the instant the converter is initially turned on to the stored energy level, whereby said converter provides power at a predetermined output level at the instant it is turned on.

2. An electrical circuit for controlling the output of a static electrical converter in a standby power supply system having a primary source normally connected to a load comprising:
   a transistor having an output circuit connected to control the converter output as a function of the conductance of said transistor and having an input circuit for controlling the conductance of the transistor;
   means coupled to said transistor input circuit and being responsive to the output of said primary source for biasing said transistor off, whereby said converter is turned off when said primary source supplies energy to the load,
   means for storing electrical energy at a preselected level, and
   means coupled to said input circuit and being responsive to failure of said primary source for simultaneously turning on the transistor and connecting the means for storing to the input circuit to turn on the transistor at a predetermined substantially instantaneous conductance in response to and at a level varying as a function of the stored electrical energy level.

3. An electrical circuit for controlling the output of a static inverter in a standby power supply system having a primary source normally connected to a load comprising:
   a transistor having an output circuit connected to control the inverter output as a function of the conductance of said transistor and having an input circuit including a resistance for controlling the conductance of said output circuit,
   means coupled to said transistor input circuit and being responsive to the output of said primary source for biasing said transistor off, whereby said inverter is turned off when said primary source supplies energy to said load,
   a capacitor connected to the input circuit;
   means for charging the capacitor to a preselected voltage, and
   means coupled to said transistor input circuit and being responsive to failure of said primary source for simultaneously turning on the transistor and discharging the capacitor through said resistance to turn on the transistor at a predetermined instantaneous conductance which is a function of the capacitor charge.

4. An electrical circuit for controlling the output of a static electrical converter for supplying energy to a load comprising: a DC source, variable conductance means for connecting said DC source to said converter, means for storing electrical energy at a preselected level, means responsive to the electrical condition of the load for producing a control signal varying as a function of the load condition, and means for controlling said means for connecting to regulate the converter output and normally maintaining said means for connecting at a low conductance to turn off said converter, said means for controlling being responsive to the stored electrical energy level at the instant the converter is turned on and being responsive to the control signal thereafter.

5. An electrical circuit for controlling the output of a static electrical inverter in a standby power supply system having a primary source normally connected to a load comprising: means for storing a preselected reference voltage, means responsive to the voltage across the load for producing a control signal varying as a function of the load voltage, and means for controlling the inverter output and being responsive to the output of said primary source to normally turn said inverter off when said primary source supplies energy to said load, said means for controlling including means responsive to the failure of said primary source to turn on the inverter to an instantaneous predetermined output level which is a function of the stored reference voltage and said means for controlling thereafter regulating the inverter output level in response to the control signal.

6. An electrical circuit for controlling the output of a static inverter in a standby power supply system having a primary source normally connected to a load comprising: means for storing a preselected reference voltage; means responsive to the voltage across the load for producing a control signal varying as a function of the load voltage; and a transistor connected to control the inverter output as a function of the conductance of said transistor, means responsive to the output of said primary source to bias said transistor off, whereby said inverter is turned off when said primary source supplies energy to the load, and means responsive to failure of said primary source to turn said transistor on to a predetermined conductance which is a function of the level of the reference voltage at the instant the inverter is turned on and to vary the transistor conductance thereafter in response to the control signal.

7. An electrical circuit for controlling the output of a static inverter in a standby power supply system having a primary source normally connected to a load comprising:
   a capacitor;
   means for charging the capacitor to a preselected voltage;
   means responsive to the voltage across the load for producing a control signal varying as a function of the load voltage; and
   a transistor connected to control the inverter output as a function of the conductance of said transistor, means including a resistance in the input circuit to said transistor and responsive to the output of said primary source for biasing said transistor off, whereby said inverter is turned off when said primary source supplies energy to said load, and means responsive to failure of said primary source to remove said turn-off bias and to discharge said capacitor through said resistance to turn said transistor on to an instantaneous preselected conductance and to thereafter vary conductance in response to the control signal.

8. An electrical circuit for controlling the output of a static inverter in a standby power supply system having a primary source normally connected to a load comprising:
   a transistor having an output circuit connected to vary the input of the inverter as a function of the conductance of said transistor to thereby control the inverter output and having an input circuit including a resistance for controlling the conductance of the output circuit;

a capacitor coupled to the input circuit;

means for charging the capacitor to a preselected voltage;

means coupled to said input circuit and responsive to the output of said primary source for biasing said transistor off, whereby said inverter is turned off when said primary source supplies energy to said load;

means responsive to the voltage across the load for producing a control signal having a level varying as a function of the load voltage; and means responsive to failure of said primary source for simultaneously removing the turn-off bias on the transistor and discharging the capacitor through said resistance to turn on said transistor at a preselected instantaneous conductance and for varying the conductance of said transistor after the instant of turning on in response to the control signal.

9. A standby power supply system having a primary source, a load connected to the primary source, a secondary source, converting means connected to the secondary source for producing power for the load from the secondary source, means for instantaneously disconnecting the primary source from the load upon failure of the primary source, and output control means for controlling the output of the converting means to maintain a predetermined electrical load condition, said output control means comprising:

sensing means responsive to the load condition for producing a control signal varying as a function of the load condition, means connected to the converting means for varying the energy delivered by the converting means to the load from the secondary source in response to the control signal, and a memory device having a preselected energy level for controlling the means for varying at the instant the primary source fails to turn on said means for varying of a momentary predetermined level determined by said preselected energy level.

10. A standby AC power supply system having a primary AC source, a load connected to the primary AC source, a DC source, a static inverter connected to the load and to the DC source for producing AC for the load, means for instantaneously disconnecting the primary AC source from the load upon failure of the primary AC source, and output control means for controlling the output of the inverter to maintain a predetermined voltage across the load, said output control means comprising:

means connected to the inverter for varying the energy delivered by the inverter to the load from the DC source, and a memory device having a preselected energy level for controlling the means for varying at the instant the primary AC source fails to turn on said means for varying to a predetermined level determined by the memory device energy level.

11. A standby AC power supply system having a primary AC source, a load connected to the primary AC source, a DC source, a static inverter connected to the load and to the DC source for producing AC for the load, means for instantaneously disconnecting the primary AC source from the load upon failure of the primary AC source, and output control means for controlling the output of the inverter to maintain a predetermined voltage across the load, said output control means comprising:

sensing means responsive to the load voltage for producing a control signal varying as a function of the load voltage, means connected to the inverter for varying the energy delivered by the inverter to the load from the DC source in response to the control signal, and a memory device having a preselected energy level for controlling the means for varying at the instant the primary AC source fails to turn on said means for varying to a momentary predetermined level determined by the memory device energy level.

12. A standby AC power supply system having a primary AC source, a load connected to the primary AC source, a DC source, a static inverter connected to the load and to the DC source for producing AC for the load, means for instantaneously disconnecting the primary AC source from the load upon failure of the primary AC source, and output control means for controlling the output of the inverter to maintain a predetermined voltage across the load, said output control means comprising:

sensing means responsive to the load voltage for producing a control signal having a level varying as a function of the load voltage;

a memory device for storing energy at a preselected level;

a transistor connected to control the input level of the inverter as a function of the conductance of said transistor to thereby control the energy delivered by the inverter to the load from the DC source, said transistor connected to be controlled by the stored energy level at the instant the transistor is turned on and by the control signal thereafter; and means for instantaneously connecting the transistor to be controlled by the stored energy level upon failure of the primary AC source.

13. A standby AC power system having a primary AC source, a DC source, a load connected to the primary AC source, a static inverter connected to the load and energized by the DC source for producing AC power for the load, means responsive to the level of the primary AC source for instantaneously disconnecting the primary AC source from the load upon failure of the primary AC source, and output control means for controlling the output voltage of the inverter, said control means comprising:

a transistor connected to vary the level of the AC produced by the inverter, a voltage regulator circuit responsive to the load voltage for controlling the transistor to decrease the conductance of the transistor as a function of the amount that the load voltage is above a predetermined level, means for instantaneously turning on the transistor upon failure of the primary AC source, and a capacitor connected to have a charge at the instant the transistor is turned on and connected to discharge through the transistor to make the transistor substantially instantaneously conductive at a predetermined level.

14. A standby AC power supply system comprising a primary AC source, a load connected to the primary AC source, a DC source, a static inverter connected to the DC source for producing AC for the load, means for producing a switching signal upon failure of the primary AC source, means for instantaneously disconnecting the primary AC source from the load in response to the switching signal, a transistor connected to control the inverter to vary the energy delivered from the DC source to the load, means responsive to the load voltage and connected to control the conductance of the transistor in response to said load voltage, means for storing electrical energy and for discharging this energy to instantaneously and momentarily control the conductance of the transistor at the instant the transistor is turned on, and means for instantaneously turning on the transistor in response to the switching signal.

15. An AC load; a primary AC source connected to the load; an inverter having input, output and control terminals with said output terminals connected to the load; a DC source connected to the input terminals of the inverter; means for instantaneously disconnecting the primary AC source from the load in response to a failure of said primary AC source; control means connected to the control terminals of the inverter for controlling the inverter output; means for storing electrical energy at a preselected level; sensing means connected to the load for producing a control signal having a level varying as a function of the voltage across said load; and means for instantaneously turning on the control means in response to a failure of the primary AC source, said control means responsive to the stored level of electrical energy at the instant of being turned on to control the inverter output and responsive after the instant of being turned on to the control signal level to control the inverter output.

16. An AC load; a primary AC source connected to the load; a DC source; a static inverter having a pair of power transistors having input and output circuits, said transistors connected in a push-pull arrangement with an output transformer; oscillating means for delivering an alternating signal to the input circuit of the power transistors to turn said transistors alternately on and off to produce a sine wave AC power output; means for instantaneously disconnecting the primary AC source from the load in response to a failure of said primary AC source; a control transistor having an input circuit and an output circuit with said output circuit connected between a power source and the input circuit of the power transistors to control the conductance of said power transistors as a function of the conductance of said control transistors; sensing means for producing an output signal varying as a function of the load voltage, said sensing means connected to deliver said output signal to the control transistor input circuit; a capacitor; means for charging the capacitor to a preselected voltage; means responsive to a failure of the primary AC source for instantaneously upon said failure connecting the capacitor to the input circuit of the control transistor to discharge said capacitor through said input circuit of said control transistor to instantaneously and momentarily control the conductance of the output circuit of said control transistor in response to the level of charge of said capacitor.

References Cited

UNITED STATES PATENTS

| | | | |
|---|---|---|---|
| 3,012,181 | 12/1961 | Schultz | 321—2 |
| 3,196,335 | 7/1965 | Williams | 321—2 |
| 3,293,530 | 12/1966 | Baude | 307—66 |
| 3,265,952 | 8/1966 | Cutler | 321—18 |
| 3,229,111 | 1/1966 | Schumacher | 307—64 |
| 3,201,592 | 8/1965 | Reinert | 307—64 |

ORIS L. RADER, *Primary Examiner.*

T. J. MADDEN, W. E. DUNCANSON,
*Assistant Examiners.*